S. F. JOHNSON & L. P. AYRES.
GOVERNOR AND AUTOMATIC CUT-OUT FOR ELECTRIC GENERATORS.
APPLICATION FILED DEC. 15, 1913.

1,219,001.

Patented Mar. 13, 1917.

S. F. JOHNSON & L. P. AYRES.
GOVERNOR AND AUTOMATIC CUT-OUT FOR ELECTRIC GENERATORS.
APPLICATION FILED DEC. 15, 1913.

1,219,001.

Patented Mar. 13, 1917.
7 SHEETS—SHEET 3.

WITNESSES
Fred H Porter
William C Linton

INVENTORS:
Solomon F. Johnson
Levi P. Ayres.
By Wallace N. Lane
ATTORNEY S. F. JOHNSON & L. P. AYRES.
GOVERNOR AND AUTOMATIC CUT-OUT FOR ELECTRIC GENERATORS.
APPLICATION FILED DEC. 15, 1913.

1,219,001.

Patented Mar. 13, 1917.
7 SHEETS—SHEET 4.

Witnesses:
John Onders
William C Linton

Inventors:
Solomon F. Johnson
Levi P. Ayres.
by Wallace R. Lane
Atty.

S. F. JOHNSON & L. P. AYRES.
GOVERNOR AND AUTOMATIC CUT-OUT FOR ELECTRIC GENERATORS.
APPLICATION FILED DEC. 15, 1913.

1,219,001.

Patented Mar. 13, 1917.
7 SHEETS—SHEET 7.

WITNESSES
Fred H. Potter
William C. Linton

INVENTORS
Solomon F. Johnson
Levi P. Ayres.
By Wallace R. Lane
ATTORNEY

UNITED STATES PATENT OFFICE.

SOLOMON F. JOHNSON AND LEVI P. AYRES, OF INDIANAPOLIS, INDIANA.

GOVERNOR AND AUTOMATIC CUT-OUT FOR ELECTRIC GENERATORS.

1,219,001. Specification of Letters Patent. Patented Mar. 13, 1917.

Application filed December 15, 1913. Serial No. 806,751.

*To all whom it may concern:*

Be it known that we, SOLOMON F. JOHNSON and LEVI P. AYRES, citizens of the United States, residing at Indianapolis, in the county of Marion and State of Indiana, have invented new and useful Improvements in Governors and Automatic Cut-Outs for Electric Generators, of which the following is a specification.

The present invention generally relates to circuit breaking and closing mechanism to be used in systems for charging storage batteries, and has for its primary object the provision of an apparatus adapted to establish a circuit between a battery and generator after the latter has developed the required voltage for charging the battery and disconnecting the generator from its driver when the generator has reached a predetermined speed so as to prevent the overcharging of the battery.

Another object of the invention is to provide an automatically controlled switch for a device of this character whereby the circuit will be instantaneously closed or opened, which will prevent any sparking or burning at the switch plates during their opening and closing operation.

A further object of the invention is to provide a combined governor and clutch wherein the operation of the switch will be automatically controlled and the power disconnected when the voltage output of the generator has gone beyond a predetermined degree.

With the above and other objects in view the invention may be said to consist of the novel features of construction, combination, formation and arrangement of parts as will be hereinafter more fully described and particularly pointed out in the appended claims.

In the accompanying drawings has been illustrated the simple and preferred forms of the invention, it being understood that no limitation is necessarily made to the precise structural details therein exhibited, but the right is reserved to make any changes or modifications to which recourse may be had and which come within the scope of the present invention.

In the particular embodiments of the invention the devices are used in connection with an electric generator A having leading from one of its terminals a wire B being connected to a storage battery C to be charged and which is arranged in series and connected with the other terminal of the dynamo by means of the return wire D. Interposed within the return wire D is the automatic control switch E forming part of the subject matter of the present invention.

Figure 1:
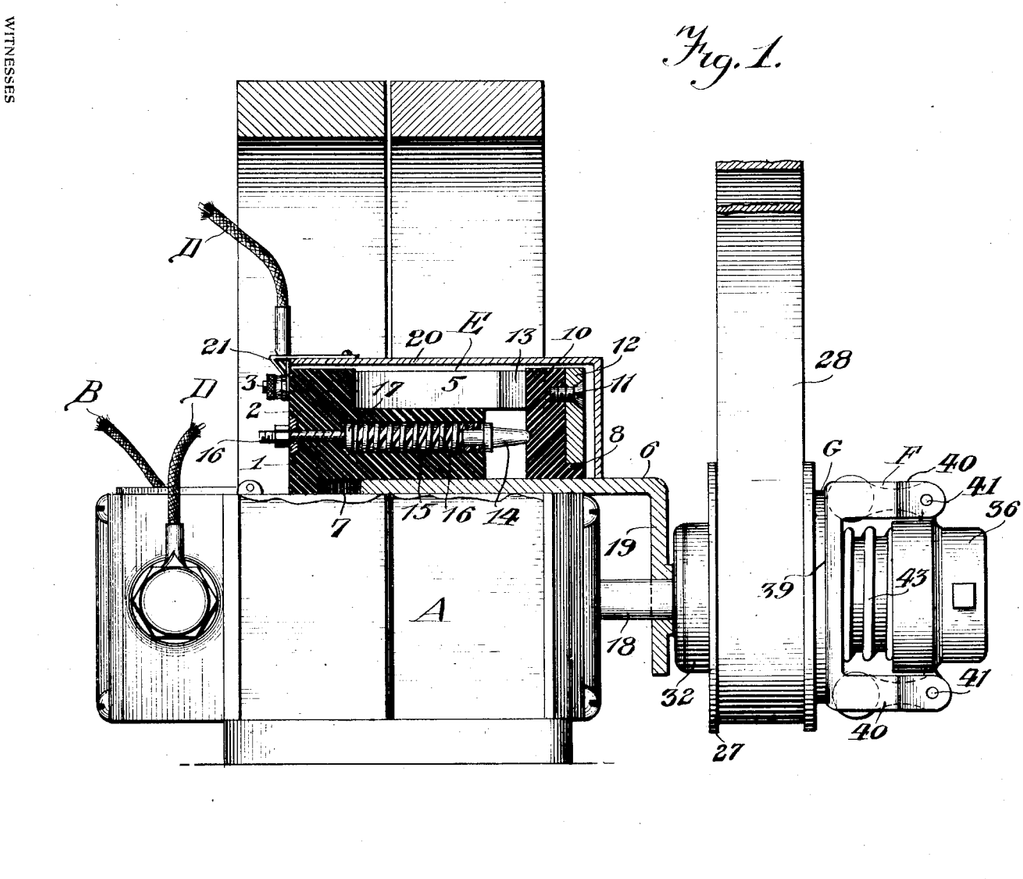
Figure 1 is a side elevation of a generator embodying our invention, having parts thereof in section.
Figure 2:
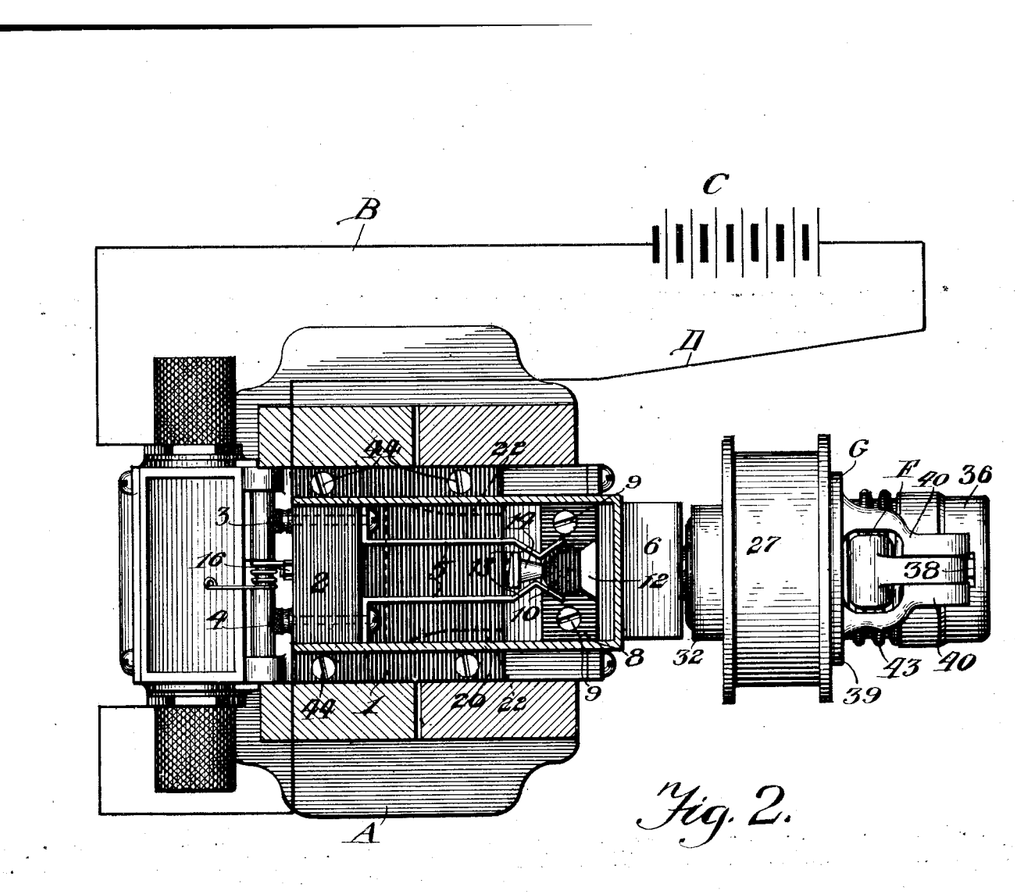
Fig. 2 is a horizontal section through the magnets of the generator and the switch closure illustrating the switch mechanism and other parts of the invention in plan view.

The automatic switch E comprises a base or suitable support 1 being made of fiber wood or other suitable insulating material and rests upon the frame work of the electric generator A as shown. At the rear end of the base there is provided a raised portion 2 having secured thereto by means of the bolts 3 and 4 respectively the switch blades 5. The bolts 3 and 4 illustrate the terminals of the switch which are connected to and in circuit with the return wire D. Slidably mounted upon the frame work of the generator is a bracket 6, which is adapted to be guided by a recess 7 formed within the lower face of the support 1. Secured to the horizontal arm of the sliding bracket 6 is an insulating block 8 made of fiber wood or other insulating material and is rigidly held in place by means of the set screws 9. Extending vertically upon the block 8 and formed integral therewith is a block 10 of non-conducting material having a rounded outer face, as better illustrated in Fig. 2 of the drawing. Secured to the rear wall of the block 10 by means of a set screw 11 is a metallic conducting plate 12. The outer free ends of the switch blades 5 are bent inwardly and then outwardly as at 13, forming substantially V-shaped projections which are adapted to rest upon the outer face of the block 10 and the plate 12 in opening and closing the battery charging circuit 8. The front wall of plate 12 lies tangently upon the rear wall of the block 10 and the side walls of this plate extend at an angle which is in the same plane as the end angle extensions 13 of the switch blades, so that when the angle extensions 13 of the switch blade rest upon the side walls of plate 10 they will lie flush thereagainst.

The block 8 carrying the block 10 and the conducting plate 12 is adapted to slide with the bracket 6 as the same is permanently affixed thereto and when the block 10 is in contact with the switch plate 5 the battery charging circuit is open but when the switch blades are in contact with the blades 12 the battery charging circuit is closed. For normally holding the block 10 in contact with the switch blades, whereby the charging circuit will be opened, we provide a spring actuated plunger 14, the outer end of which rests upon the front wall of the block 10. This spring actuated plunger 14 is adapted to rest within a cylindrical recess 15 formed within the base 1 and positioned within the recess is a coil spring 16 normally holding the plunger 14 in an outward position. A threaded rod 16 is mounted within the base carrying at one end a plate 17 which rests upon the inner end of a coil 16 whereby the tension of the coil spring may be increased or diminished as the case may require. Extending from one end of the generator is the armature shaft 18 having slidably mounted thereupon the depending arm 19 of the bracket 6.

To provide means for housing the switch a cover 20 is adapted to rest upon the base 1 having a spring lock 21 secured to one end thereof which is adapted to rest upon the raised portion 2 of the insulated base. The lower end of the front wall is also cut away to permit the bracket 6 to slide thereunder. The lower portion of the forward end of the cover is cut away and rests upon the upper face of base 1 and projecting inwardly from the lower edge of this cut away portion are tapered projections 22 which rest within recesses 23 formed within the insulated base 1 which help to retain the cover in place.

For shifting the bracket 6 so that the block 10 and the plate 12 will be thrown in contact with the switch blades 5 we provide a centrifugal governor F which automatically controls the switch whereby the same will be closed when the prime mover has obtained the required velocity for generating the proper voltage to be supplied to the battery and which is adapted to release the frictional clutch G when the prime mover has gone beyond a predetermined velocity to prevent the overcharging of the storage battery.

Keyed to the projecting end of the armature shaft 18 by means of pins 24 is a sleeve 25 having an annular flange 26 formed integral with one end thereof. Slidably mounted upon the outer periphery is a belt pulley 27 carrying a belt 28, which is connected to a motor or other prime mover for operating the generator. The flange 26 carried by the sleeve 25 rests within a cut away portion formed in the pulley and forms a thrust bearing to limit the movement of the pulley in one direction. The sleeve 25 has a greater interior diameter than the exterior diameter of the shaft 18, thereby forming an annular space 29 therebetween. Slidably mounted upon the shaft 18 is a sleeve 30 which is adapted to rest within the annular space 29 having its inner end bifurcated as at 31 so as to extend around the pins 24 and the opposite end of the sleeve 30 has made integral therewith a cylindrical block 32 which rests against the arm 19 of the bracket 6. Also slidably mounted upon the shaft 18 is a sleeve 33 having its inner end bifurcated so as to extend around the pins 24, and this bifurcated end of the sleeve rests against the outer face of the bifurcated ends 31 of the sliding sleeve 30. Formed contiguous with the outer end of the sleeve 33 is an annular flange 34 upon which rests the arms 35 of the centrifugal governors F. Keyed to the outer extremity of the shaft 18 is a block 36, having recesses 37 and 38 formed therein to permit the movements of the sleeve 33 and the arms 35 of the centrifugal governors. Slidably mounted upon the sleeve 25 is a block 39 having projecting rearwardly therefrom arms 40 and the latter having pivotally connected to the outer ends thereof by means of cross pins 41, the centrifugal governors. An annular recess 42 is formed within the pulley 27, having mounted therein a packing ring 43 upon which is adapted to normally rest the outer face of the block 39 and this ring 32 and the block 39 form the frictional clutch G as before referred to. For normally holding the block 39 in contact with the ring 43 we interpose between the said block and the inner face of the block 36 a coil spring 43'.

Figure 3:
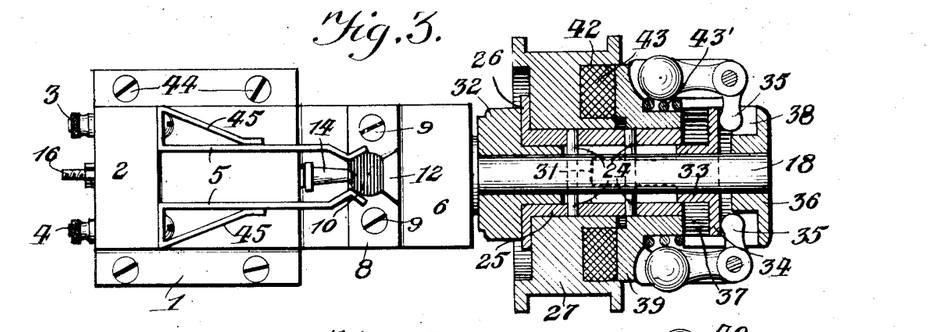
Fig. 3 is a detailed plan view of the switch mechanism, but illustrating the governor mechanisms in section and showing their normal position.
Figure 4:
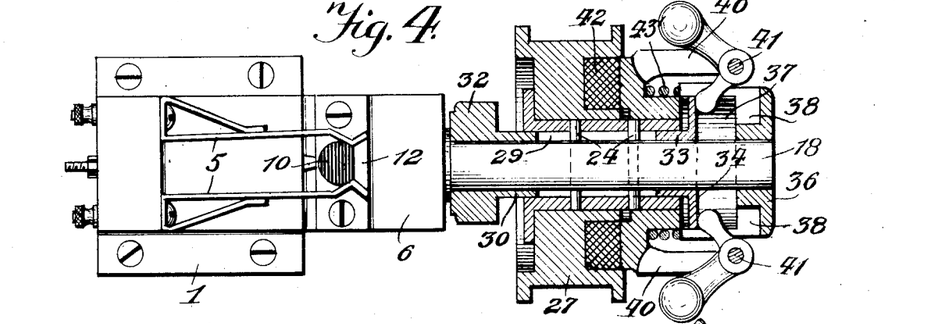
Fig. 4 is a similar view illustrating the position of the governor and its coöperating mechanism for operating the switch in closing the circuit.
Figure 5:
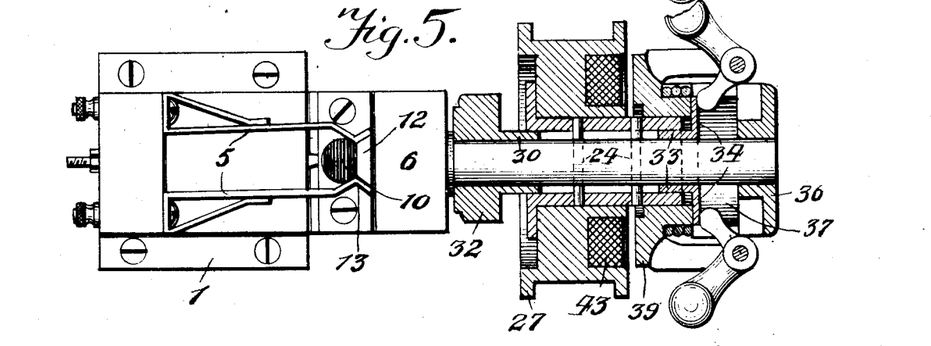
Fig. 5 is a similar view illustrating the governor, operating the frictional clutch when the prime mover has gone beyond a predetermined velocity.
Figure 6:
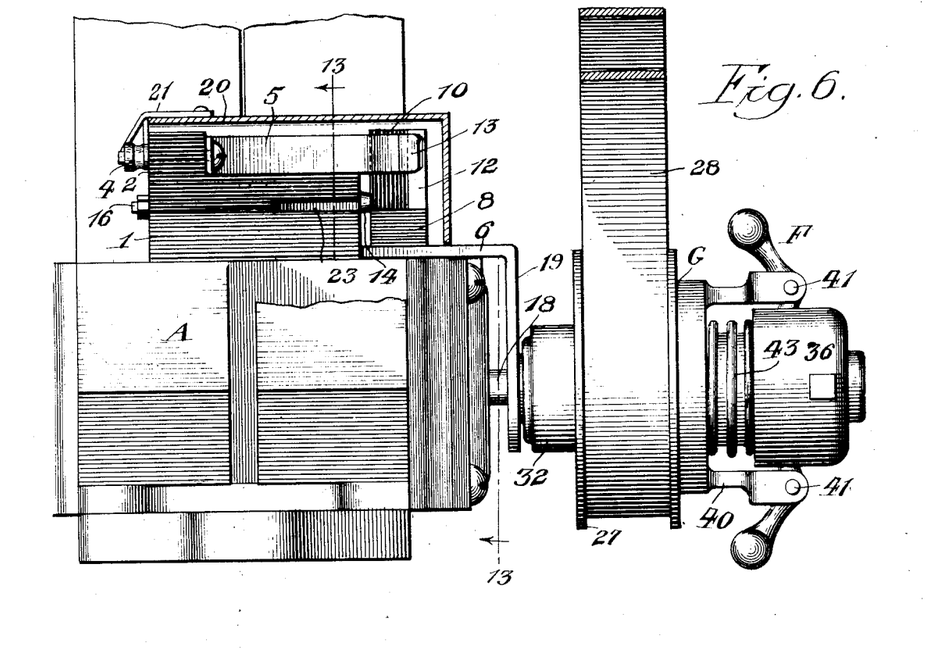
Fig. 6 is a detailed side elevation of the generator, having parts thereof in section to illustrate the switch mechanism in side elevation.
Figure 7:
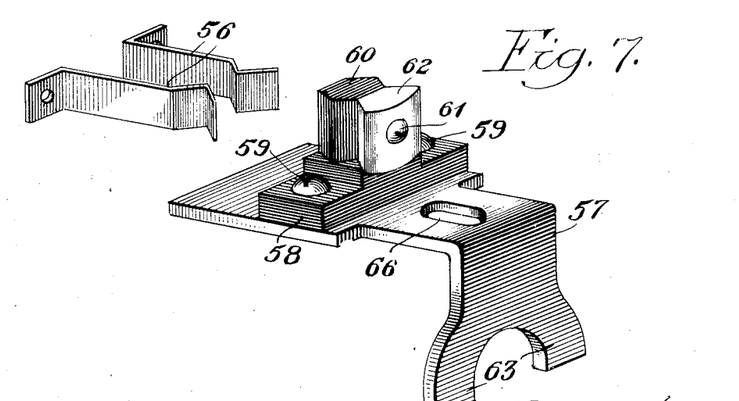
Fig. 7 is a perspecive view of a slightly modified form of the switch.

Reference now being had to Figs. 3 to 5 inclusive it will be noted that we have shown in Fig. 3 the positions of the various parts of the invention when at rest or at normal. When the prime mover has been started the pulley 27 will be rotated through the instrumentality of the belt 28 and when the prime mover has gained the required velocity to generate the proper voltage to be supplied to the battery, the weights of the centrifugal governor will travel outward, as shown in Fig. 4 of the drawings, which in turn forces the sleeve 33 inwardly by means of the projecting arms 35. As the sleeve 33 is forced inwardly it also forces the sleeve 30 with it, which in turn moves the bracket 6 and causes the conducting plate 12 to come in contact with the switch blades 5, thereby closing the charging circuit and permitting the generator to charge the battery in the usual manner.

To prevent the overcharging of the battery when the prime mover has gone beyond a predetermined velocity of speed, the weights of the centrifugal governor travel still farther outwardly as disclosed in Fig. 5 wherein they gain by the rapid rotation of the pulley 27, a greater pulling power than the tension of the coil spring 43' and in this event the weights of the governor pull upon the block 39 through the arms 40 thereby releasing the block 39 from the packing ring 43. At this stage of the operation the pulley is permitted to freely rotate without carrying the shaft 18 with it as the pulley is freely mounted upon the sleeve 25. From this it is obvious that when the pulley has gone beyond a predetermined speed it will be released from the shaft 18, thereby preventing the armature shaft from rotating too fast wherein the generator would supply greater voltage than is necessary, but when the armature has slowed down in its speed the block 39 will again come in contact with the packing ring 43 and held in contact by means of the coil spring 43' whereupon the generator will be permitted to continue with its operation whenever the prime mover drops below a predetermined speed the centrifugal governors will release the bracket 6 through the instrumentality of the mechanism before described and allow the insulating block 10 to come between the switch blades in opening the charging circuit.

The insulating base 1 is secured to the frame-work of the generator by means of set screws 44, whereby the same will be rigidly held in place. In the construction of the switch blades 5 in Figs. 3 to 5 of the drawing, the inner ends thereof are provided with extensions 45 which are bent inwardly, having their free ends resting upon the outer faces of the switch blades, which will give the blades a stronger and more positive action when contacting with the block 10 and the conducting plate 12.

Figure 8:
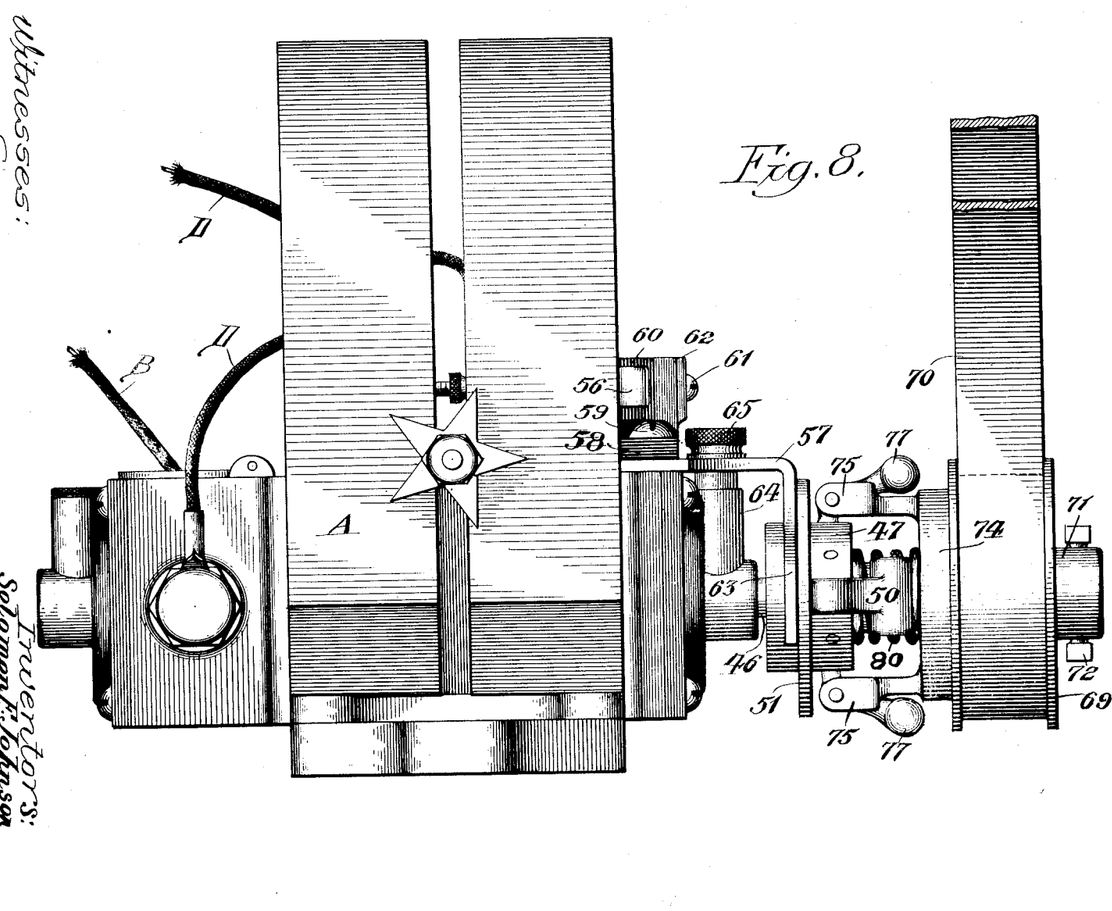
Fig. 8 is a side elevation of a generator, having the modified form of the switch and a modified form of a governor and frictional clutch applied thereto.

In the modified form of the invention as disclosed in Figs. 7 to 12 inclusive, we provide a slightly modified form of a switch and centrifugal governor, wherein two sets of governor balls are used, one for operating the switch and the other for operating the frictional clutch. The electric generator A as shown in Fig. 8 has extending therefrom, an armature shaft 46 upon which is mounted the centrifugal governor and frictional clutch, as will be hereinafter more fully described. Keyed to the shaft 46 is a cylindrical block 47 having pivotally mounted, as at 48, within recesses 49 the centrifugal governors 50 which are for operating the switch. Slidably mounted upon the block 47 is a ring 51, which normally rests upon the cam faces 52 of the arms of the centrifugal governors 50, whereby when the armature shaft has gained a predetermined speed, the centrifugal governors will move outwardly and the cammed portions 52 of the arms of the governors will slide the ring 51 upon the block 47 for operating the switch. Mounted upon the frame-work of the generator and secured thereto by means of set screws 53 is an insulated support 54, having fixed thereto by means of the bolts 55 the spring blades 56 of the switch which are substantially the same as the blades 50 as heretofore described in the preferred form of the invention. The blades 55 are connected in circuit with the return wire D of the charging circuit whereby the charge being directed to the storage will be governed as heretofore described. Slidably mounted upon the frame-work of the generator is a bracket 57 having mounted upon the horizontal arm thereof an insulating block 58 which is rigidly held in place by means of the set screws 59. Formed integral with the block 58 is a vertically extending block 60, also of insulating material, and upon which blades 59 are adapted to rest when the battery charging circuit is open. Secured to the block 60 by means of a set screw 61 is a metallic plate 62, a suitable conducting material which is also adapted to come in contact with the blades 56 for closing the battery charging circuit. The vertical portion of the angle or bracket 57 is bifurcated as at 63 and rests over the block 47, being keyed to the armature shaft 46. From this it will be seen that upon the outward movement of the centrifugal governors 50, the angular bracket 57 will be forced inwardly whereby the conducting plate 62 will come in contact with the blades 56 for closing the battery charging circuit. To provide a guide for the bracket 57 a bushing 64 is formed integral with the framework of the generator and has mounted therein a thumb screw 65. This thumb screw 65 extends through the elongated slot 66 formed within the horizontal arm of the bracket 57 thereby forming a suitable guide for the said bracket. For normally holding the bracket in a position so that the block 60 will be in contact with the arms 66 whereby the charging circuit will be normally held open, we mount upon the support 54 a coil spring 67 having one end resting against the block 60 which in turn will force the bracket in one direction until its movement is limited through the guide slot connection as before described.

Freely mounted upon the armature shaft 46 is the sleeve 68, having cast integral with one end thereof a belt pulley 69 which is adapted to be rotated by the prime mover through the instrumentality of the belting 70. The inner end of the sleeve 68 rests upon the outer face of the block 47 which forms a thrust bearing for the sleeve and detachably secured to the end of the armature shaft 46 is a block 71, held in place by means of the set screws 72, and which also provide a thrust bearing for the pulley 69.

Mounted within a recess formed within the pulley 69 is a packing ring 73 forming one of the members of the frictional clutch and slidably mounted upon the sleeve 68 is a circular block 74 forming the other member of the frictional clutch. Projected from the outer face of the block 74 and extending diametrically opposite, are a pair of arms 75 having their outer extremities bifurcated in which are pivotally mounted as at 76 the centrifugal governors 77. Formed integral with the centrifugal governors 77 are arms 78, which rest within recesses 79 formed within the block 47. From the foregoing it is obvious that when the armature shaft has gained a predetermined speed of rotation, the centrifugal governors 50 will move outwardly for operating the switch, but when the armature shaft has gone beyond a predetermined speed the centrifugal governor 77 will move outwardly and the arms 78 resting within the recesses 79 of the block 47 will act as a pivot for the governors whereby the circular block 74 of the frictional clutch will be pulled out of contact with the packing ring 73, thereby allowing the pulley 69 to run free. Encircling the sleeve 68 and resting between the blocks 47 and 74 is a coil spring 80, the purpose of which is to hold the block 74 in contact with the packing ring 73 until the weights of the centrifugal governor 77 have gained sufficient power to withdraw the blocks 74 from the packing ring 73, thereby opening the frictional clutch.

Figure 9:
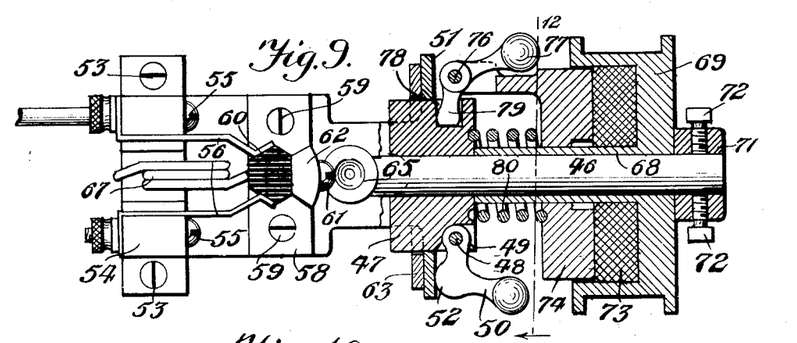
Fig. 9 is a plan of the switch, but illustrating the governor and friction clutch in section taken substantially on the line 9—9 of Fig. 12 in the direction of the arrows as shown and illustrating the governor in its normal position.
Figure 10:
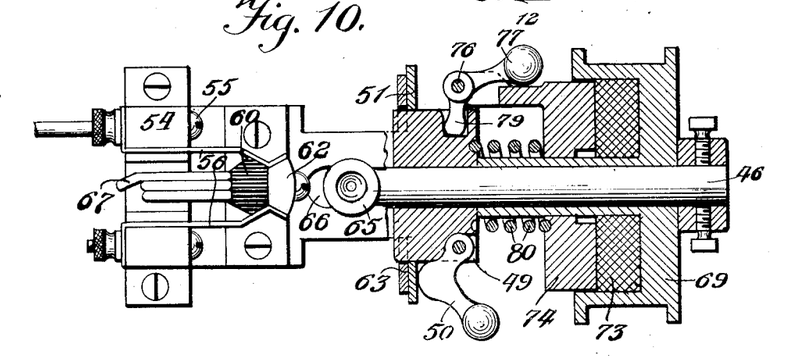
Fig. 10 is a similar view illustrating the governor in position for operating the switch and for closing the circuit.
Figure 11:
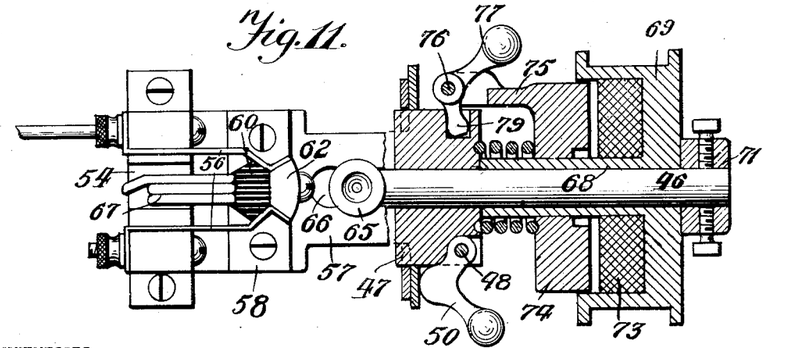
Fig. 11 illustrates a similar view wherein both of the governors are operated for closing the circuit and opening the frictional clutch.
Figure 12:
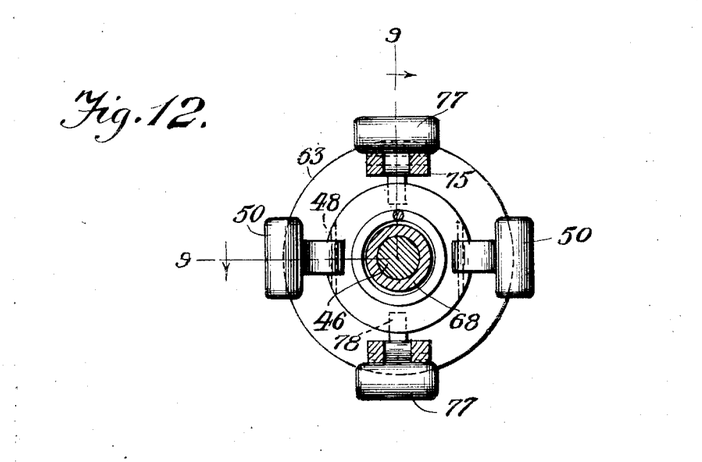
Fig. 12 is a detail sectional view of the governor used in connection with the modified form of the invention and taken on the line 12—12 of Fig. 9.
Figure 13:
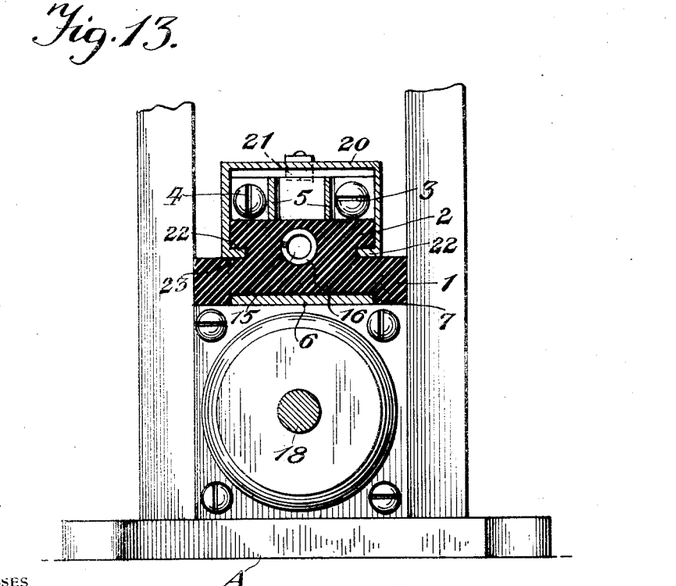
Fig. 13 is a detail sectional view taken through the switch on the line 13—13 of Fig. 6 in the direction of the arrows as shown.

When having reference to Fig. 9, we have disclosed the position of the switch and the other parts of the modified form of the invention when idle or in their normal position, but when the prime mover starts the rotation of the pulley and the same having gained a predetermined speed the centrifugal governors 50 will move outwardly in the position as shown in Fig. 10 of the drawings, thereby throwing the conducting plate 62 in contact with the switch blades and closing the circuit. When the prime mover has gone to a speed which would generate too great a voltage to be supplied to the battery which would damage the battery, the centrifugal governors 77 will move outwardly and draw the block 74 against the tension of the spring 80 away from the packing ring 73, thereby releasing the connection between the pulley 69 and the armature shaft which permits the pulley to freely rotate without affecting the rotation of the armature shaft as disclosed in Fig. 11 of the drawings.

The outer walls of the insulating block 60 and the conducting plate 62 are cut at an angle whereby the angular extremities of the switch blades will contact the angular walls of the conducting plate 62 almost instantaneously, thereby preventing any sparking or burning during the opening and closing of the switch. The blades will leave the conducting plate without any cutting or rubbing action which would cause any sparking or burning at this point. In the preferred form of the switch construction the outer walls of the insulating block 10 are rounded as shown, whereby the switch blades will pass freely thereover and strike the angular walls of the conducting plate 12 instantaneously, thereby preventing any rubbing or cutting action which would also cause sparking and burning action when connecting and disconnecting the switch.

We claim:

1. The combination with an electric generator and the armature shaft thereof, of driving means for rotating the armature shaft, a charging circuit connected to the generator, a switch in said charging circuit and means including a single governor associated with the driving means for opening and closing the switch and disconnecting the driving means from the armature shaft.

2. The combination with the storage battery, a charging circuit therefor, a generator and switch included in said circuit, of an armature shaft, driving means for rotating said shaft, means associated with the driving means whereby the switch will be closed when the armature shaft has gained a predetermined speed and opened when the armature shaft has gone below a predetermined speed, including means whereby the driving means will be disconnected from the armature shaft when the same has gone beyond a speed which is greater than is necessary for closing the switch.

3. The combination with a storage battery, a charging circuit therefor, a generator and a switch included in said circuit, of an armature shaft projecting from the generator, a centrifugal governor carried by the armature shaft, a driving connection between the armature shaft and the prime mover, means for operatively connecting the switch with the centrifugal governor, whereby the switch may be opened and closed and means governed by the centrifugal governor for disconnecting the driving means from the armature shaft when the said shaft attains a predetermined speed for the purpose specified.

4. The combination with a storage battery, a charging circuit therefor, a generator and a switch included in said circuit, of an armature shaft projecting from the generator, a centrifugal governor carried by the armature shaft, a bracket supported upon the generator, the contact member of the switch being carried by the bracket for opening and closing the switch, and means for operatively connecting the bracket with the centrifugal governor for the purpose specified.

5. In combination with a storage battery, a charging circuit therefor, a generator and a switch included in said circuit, of an armature shaft extending from the generator, a centrifugal governor carried by the armature shaft, of driving means associated with said governor for rotating the armature shaft whereby when the shaft has gained a predetermined speed of rotation the switch will be closed and when it has gone beyond a predetermined speed of rotation, the driving means will be disconnected.

6. The combination with a storage battery, a charging circuit therefor, a generator and a switch included in said circuit, of an armature shaft extending from said generator, driving means associated with said armature shaft, means carried by the armature shaft whereby the switch may be opened and closed and the driving means disconnected for the purpose specified.

7. The combination with a battery, a charging circuit therefor, an electric generator included in said circuit, a driving pulley for said generator, of a switch included in the circuit, a sliding contact member for opening and closing the switch, means for normally holding the switch open and a centrifugal governor located on the side of said pulley opposite said generator for closing the switch when the generator has obtained a predetermined speed.

8. The combination with a battery, a charging circuit therefor, an electric generator and switch included in the circuit, of an armature shaft projecting from the generator, a sectional sleeve slidably mounted upon the armature shaft, driving means surrounding said sleeve, a centrifugal governor carried by the armature shaft and normally resting against one end of the said sleeve, means for normally holding the switch open and means for operatively connecting the switch with the sleeve whereby the centrifugal governor will close the switch when a predetermined speed has been obtained by the armature shaft.

9. The combination with a battery, a charging circuit therefor, an electric generator and switch included in the circuit, of an armature shaft projecting from the generator, a sleeve keyed to said shaft, a sectional sleeve slidably mounted upon the shaft within the first mentioned sleeve, driving means loosely mounted upon the sleeve, centrifugal governors carried by the shaft, a frictional clutch connecting the governors with the driving means, and means whereby the centrifugal governors will operate the sectional sleeve for opening and closing the switch and for releasing the frictional clutch when the armature shaft has gone beyond the predetermined speed of rotation.

10. An apparatus of the class described, a generator, a shaft on said generator, a driving device on said shaft, a clutch operatively interposed between said device and said shaft, a centrifugal governor on said shaft and in control of said clutch, whereby said clutch will be opened when the shaft reaches a predetermined speed, said driving device being interposed between the generator and the governor, and the circuit activated by the generator.

11. An apparatus of the class described, a generator, a battery circuit, a driving device for said generator, means to close and open the battery circuit, means to operatively connect the generator and the driving device, and a single governing means for said circuit controlling means and for said connecting means, whereby the circuit will be closed when the generator has reached a certain speed and the generator disconnected from its driving device whenever it reaches a predetermined higher speed.

12. An apparatus of the class described, a generator, a battery circuit including a switch, driving device for the generator, a clutch device for operatively connecting said driving device with said generator, a device movable to open or close said switch, a governing member for operating said clutch device at one speed of the generator and said switch device at another speed of the generator.

13. An apparatus of the class described, a generator, a circuit including a switch, a driving device for the generator, a clutch device associated with said driving device to operatively connect the generator therewith, a switch operator, a governor adapted to cause relative movement between the switch operator and the clutch device at one speed of the generator, whereby the switch will be closed, and another relative movement between the switch operator and the clutch device at another speed of the generator whereby the driving device will be operatively disconnected from the generator.

14. An apparatus of the class described, a generator including a battery circuit and a normally open switch therefor, a driving device for the generator including a normally clutched clutch device, a single means controlled by the speed of the generator to close the said switch at one speed of the generator and to unclutch the clutch device at another speed thereof.

15. An apparatus of the class described, a generator, a battery circuit including a switch, a generator shaft, a driving device for the generator shaft, a clutch device normally operatively connecting said driving device and said generator shaft, a bell crank governor device pivoted on said clutch device, means having a limited movement on said shaft to operate said switch and having a part in coöperative relation with said bell crank governor device, whereby said governor device at one speed of the generator will shift said sliding device to one limit of its movement, using the clutch device as a fulcrum and at a higher speed of the generator will shift said clutch device to disconnect said drive shaft and said generator, using said slidable member as a fulcrum.

16. In apparatus of the class described, a generator, a generator shaft projecting therefrom, a sleeve on said generator shaft but spaced therefrom by a second sleeve, a drive pulley or the like on said sleeve, a governor device on the opposite side of said drive pulley or the like from said governor and adapted to operatively connect and disconnect said drive pulley from said governor shaft and to operate said sleeve.

17. In apparatus of the class described, a generator having a shaft, a sleeve on said shaft and non-revoluble with relation thereto, switch devices controlled by said sleeve, a driving pulley surrounding said sleeve, a clutch for operatively connecting the pulley with the sleeve, a single governor for operating said clutch at one speed of the shaft and for operating said switch through said sleeve at another speed of the shaft.

18. In apparatus of the class described, a generator having a shaft, a sleeve on said shaft, switch devices controlled by said sleeve, a driving pulley surrounding said sleeve and a governor and connections for operatively connecting said driving pulley to the shaft, the driving pulley being located between the governor and the generator.

In witness whereof, we hereunto subscribe our names to this specification in the presence of two witnesses.

SOLOMON F. JOHNSON.
LEVI P. AYRES.

Witnesses:
LEWIS J. BURNETT,
ELLIOTT AYRES.